(12) United States Patent
Lee et al.

(10) Patent No.: US 11,336,901 B2
(45) Date of Patent: *May 17, 2022

(54) INTRA PREDICTION METHOD AND APPARATUS

(71) Applicant: Electronics and Telecommunications Research Institute, Daejeon (KR)

(72) Inventors: Jin Ho Lee, Daejeon-si (KR); Hui Yong Kim, Daejeon-si (KR); Sung Chang Lim, Daejeon-si (KR); Jong Ho Kim, Daejeon-si (KR); Ha Hyun Lee, Seoul (KR); Se Yoon Jeong, Daejeon-si (KR); Suk Hee Cho, Daejeon-si (KR); Jin Soo Choi, Daejeon-si (KR); Jin Woong Kim, Daejeon-si (KR); Chie Teuk Ahn, Daejeon-si (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/021,344

(22) Filed: Sep. 15, 2020

(65) Prior Publication Data

US 2020/0413073 A1 Dec. 31, 2020

Related U.S. Application Data

(63) Continuation of application No. 15/264,647, filed on Sep. 14, 2016, now Pat. No. 10,812,803, which is a
(Continued)

(30) Foreign Application Priority Data

Dec. 13, 2010 (KR) .................. 10-2010-0126775
Dec. 13, 2011 (KR) .................. 10-2011-0133708

(51) Int. Cl.
*H04N 19/159* (2014.01)
*H04N 19/105* (2014.01)
(Continued)

(52) U.S. Cl.
CPC ......... *H04N 19/159* (2014.11); *H04N 19/105* (2014.11); *H04N 19/117* (2014.11);
(Continued)

(58) Field of Classification Search
CPC .. H04N 19/159; H04N 19/105; H04N 19/126; H04N 19/61; H04N 19/50;
(Continued)

(56) References Cited

U.S. PATENT DOCUMENTS 7,620,107 B2  11/2009 Lee et al.
7,688,893 B2   3/2010 Morimoto et al.
(Continued)

FOREIGN PATENT DOCUMENTS

KR  10-2007-0062146 A   6/2007
KR  10-2009-0012985 A   2/2009
(Continued)

OTHER PUBLICATIONS

International Search Report dated May 8, 2012, in counterpart International Application PCT/KR2011/009599 (3 pages in Korean).
(Continued)

*Primary Examiner* — Dramos Kalapodas
(74) *Attorney, Agent, or Firm* — NSIP Law

(57) ABSTRACT

An intra prediction method according to the present invention comprises the following steps: performing a directional prediction using at least one of a neighboring pixel of a current block and a left upper corner pixel positioned at a left upper corner of the current block so as to obtain a first prediction value for the current block; obtaining a second prediction value for the current block using the reference
(Continued)

sample positioned in the current block; and weighted summing the first prediction value and the second prediction value using a weighting matrix so as to obtain a final prediction value for the current block. According to the present invention, image encoding/decoding efficiency may be improved.

6 Claims, 14 Drawing Sheets

Related U.S. Application Data continuation of application No. 13/991,279, filed as application No. PCT/KR2011/009599 on Dec. 13, 2011, now Pat. No. 9,462,272.

(51) Int. Cl.
| | |
|---|---|
| H04N 19/117 | (2014.01) |
| H04N 19/593 | (2014.01) |
| H04N 19/50 | (2014.01) |
| H04N 19/126 | (2014.01) |
| H04N 19/13 | (2014.01) |
| H04N 19/43 | (2014.01) |
| H04N 19/61 | (2014.01) |
| H04N 19/176 | (2014.01) |
| H04N 19/182 | (2014.01) |

(52) U.S. Cl.
CPC ........... *H04N 19/126* (2014.11); *H04N 19/13* (2014.11); *H04N 19/43* (2014.11); *H04N 19/50* (2014.11); *H04N 19/593* (2014.11); *H04N 19/61* (2014.11); *H04N 19/176* (2014.11); *H04N 19/182* (2014.11)

(58) Field of Classification Search
CPC .. H04N 19/593; H04N 19/176; H04N 19/182; H04N 19/124; H04N 19/117
See application file for complete search history.

(56) References Cited

U.S. PATENT DOCUMENTS

| 8,165,195 | B2* | 4/2012 | Song | H04N 19/147 |
|---|---|---|---|---|
| | | | | 375/240 |
| 8,189,667 | B2 | 5/2012 | Kawashima et al. | |
| 8,559,512 | B2 | 10/2013 | Paz | |
| 9,083,974 | B2 | 7/2015 | Jeon et al. | |
| 2006/0072676 | A1 | 4/2006 | Gomila | |
| 2007/0086520 | A1 | 4/2007 | Kim | |
| 2007/0133891 | A1 | 6/2007 | Jeong | |
| 2007/0160133 | A1 | 7/2007 | Bao et al. | |
| 2008/0049845 | A1 | 2/2008 | Liu | |
| 2008/0123947 | A1 | 5/2008 | Moriya et al. | |
| 2008/0260031 | A1 | 10/2008 | Karczewicz | |
| 2009/0010338 | A1 | 1/2009 | Wang | |
| 2009/0245353 | A1 | 10/2009 | Choi et al. | |
| 2009/0257492 | A1* | 10/2009 | Andersson | H04N 19/105 |
| | | | | 375/240.12 |
| 2009/0290643 | A1 | 11/2009 | Yang | |
| 2010/0002775 | A1 | 1/2010 | Huang et al. | |
| 2010/0054617 | A1 | 3/2010 | Takada | |
| 2010/0118945 | A1 | 5/2010 | Wada et al. | |
| 2010/0208802 | A1 | 8/2010 | Tsukuba et al. | |
| 2010/0239002 | A1 | 9/2010 | Park et al. | |
| 2011/0038415 | A1 | 2/2011 | Min et al. | |
| 2011/0150087 | A1 | 6/2011 | Kim et al. | |
| 2011/0158314 | A1 | 6/2011 | Jeong et al. | |
| 2011/0182357 | A1 | 7/2011 | Kim et al. | |
| 2011/0228843 | A1 | 9/2011 | Narroschke et al. | |
| 2011/0249731 | A1 | 10/2011 | Zhao et al. | |
| 2011/0249732 | A1 | 10/2011 | Segall et al. | |
| 2011/0249733 | A1 | 10/2011 | Zhao et al. | |
| 2011/0249734 | A1* | 10/2011 | Segall | H04N 19/129 |
| | | | | 375/240.12 |
| 2011/0249735 | A1* | 10/2011 | Zhao | H04N 19/46 |
| | | | | 375/240.12 |
| 2011/0249741 | A1 | 10/2011 | Zhao et al. | |
| 2011/0255598 | A1* | 10/2011 | Lin | H04N 19/513 |
| | | | | 375/240.16 |
| 2011/0261880 | A1 | 10/2011 | Auyeung | |
| 2011/0280304 | A1 | 11/2011 | Jeon et al. | |
| 2011/0293001 | A1* | 12/2011 | Lim | H04N 19/14 |
| | | | | 375/240.12 |
| 2012/0082222 | A1 | 4/2012 | Wang et al. | |
| 2012/0093426 | A1 | 4/2012 | Sato | |
| 2012/0106633 | A1 | 5/2012 | Kim et al. | |
| 2012/0121011 | A1 | 5/2012 | Coban et al. | |
| 2012/0140821 | A1 | 6/2012 | Drugeon et al. | |
| 2014/0105290 | A1 | 4/2014 | Kwon et al. | |
| 2014/0341281 | A1 | 11/2014 | Bossen et al. | |

FOREIGN PATENT DOCUMENTS

| KR | 10-2009-0123559 A | 12/2009 |
|---|---|---|
| KR | 10-2010-0000011 A | 1/2010 |
| KR | 10-2010-0029343 A | 3/2010 |
| KR | 10-2013-0118219 A | 10/2013 |

OTHER PUBLICATIONS

Budagavi, Madhukar, "Angular intra prediction and ADI simplification", *Collaborative Team on Video Coding (JCT-VC) of ITU-T SG16 WP3 and ISO/IEC JTC1/SC29/WG11*, 2nd Meeting: Geneva, CH, Jul. 21-28, 2010 (pp. 1-3).

Min, Jung-Hye et al., "Unification of the Directional Intra Prediction Methods in TMuC", *Collaborative Team on Video Coding (JCT-VC) of ITU-T SG16 WP3 and ISO/IEC JTC1/SC29/WG11*, 2nd Meeting: Geneva, CH, Jul. 21-28, 2010 (pp. 1-3).

"Test Model Under Consideration" document JCTVC-B205, ITU-T SGl 6 WP3 and ISO. IEC JTC1/SC29/WG11, 2nd Meeting, Geneva, Switzerland, 2010. (179 pages, in English).

* cited by examiner

FIG. 4

FIG. 7
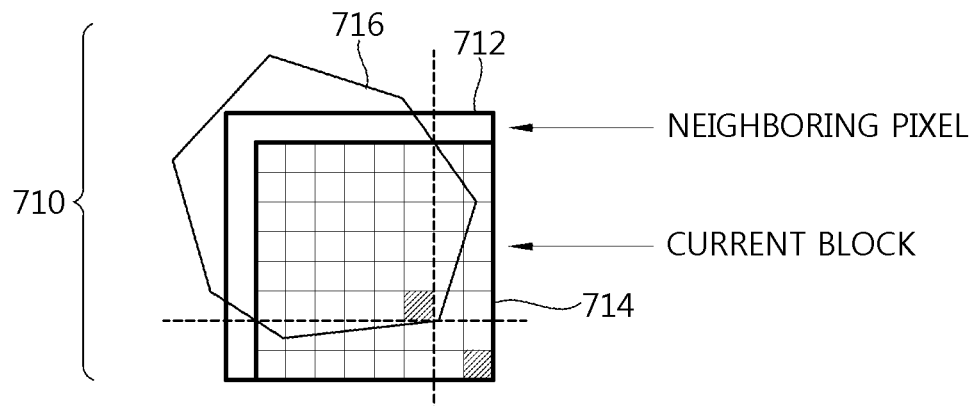
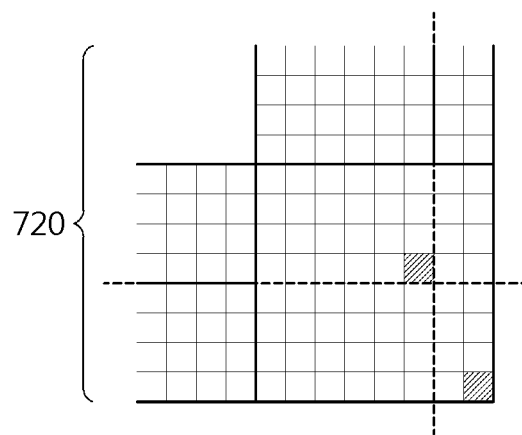
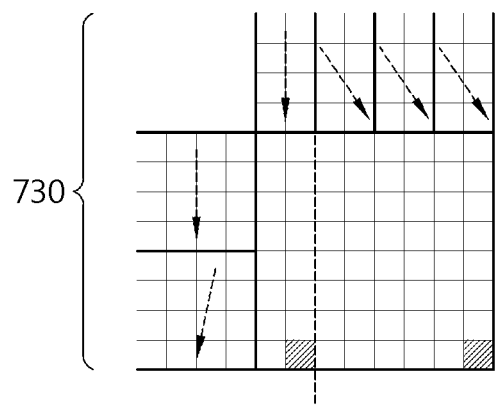

FIG. 9

| X | A | B | C | D | E | F | G | H |
|---|---|---|---|---|---|---|---|---|
| I | | | | | | | | |
| J | | | | | | | | |
| K | | | | | | | | |
| L | | | | | | | | |
| M | | | | | | | | |
| N | | | | | | | GN | HN |
| O | | | | | EO | FO | GO | HO |
| P | | | | | | FP | GP | HP |

| X | A | B | C | D | E | F | G | H |
|---|---|---|---|---|---|---|---|---|
| I | | | | | | | | |
| J | | | | | | | | |
| K | | | | | | | | |
| L | | | | DL | | | | HL |
| M | | | | | | | | |
| N | | | | | | FN | | |
| O | | | | | | | | |
| P | | | | DP | | | | HP |

INTRA PREDICTION METHOD AND APPARATUS

CROSS-REFERENCE TO RELATED APPLICATIONS

This application is a Continuation Application of U.S. application Ser. No. 15/264,647 filed on Sep. 14, 2016, which is a Continuation Application of U.S. application Ser. No. 13/991,279 filed on Jun. 3, 2013, now U.S. Pat. No. 9,462,272 issued Oct. 4, 2016, which is a National Stage of International Application No. PCT/KR2011/009599, filed Dec. 13, 2011 and published as WO 2012/081895 A1 on Jun. 21, 2012, which claims the benefit under 35 U.S.C. § 119 of Korean Patent Application No. 10-2010-0126775 filed Dec. 13, 2010 and Korean Patent Application No. 10-2011-0133708 filed Dec. 13, 2011, the entire disclosures of which are incorporated herein by reference for all purposes.

TECHNICAL FIELD

The present invention relates to image processing, and more particularly, to an intra prediction method and apparatus.

BACKGROUND ART

Recently, with the expansion of broadcasting services having high definition (HD) resolution in the country and around the world, many users have been accustomed to a high resolution and definition image, such that many organizations have conducted many attempts to develop next-generation video devices. In addition, the interest in HDTV and ultra high definition (UHD) having a resolution four times higher than that of HDTV have increased and thus, a compression technology for higher-resolution and higher-definition image have been required.

For the image compression, an inter prediction technology predicting sample values included in a current picture from a picture before and/or after the current picture, an intra prediction technology predicting sample values included in a current picture using sample information in the current picture, an entropy encoding technology allocating a short code to symbols having a high appearance frequency and a long code to symbols having a low appearance frequency, or the like, may be used.

DISCLOSURE

Technical Problem

The present invention provides video encoding method and apparatus capable of improving video encoding/decoding efficiency.

Further, the present invention provides video decoding method and apparatus capable of improving video encoding/decoding efficiency.

In addition, the present invention provides intra prediction method and apparatus capable of improving video encoding/decoding efficiency.

Technical Solution

In an aspect, there is provided an intra prediction method, including: deriving a first prediction value for the current block by performing directional prediction using at least one of neighboring samples adjacent to a current block and left upper corner samples at a left upper corner of the current block; deriving a second prediction value for the current block by using a reference sample positioned in the current block; and deriving a final prediction value for the current block by performing a weighting sum for the first prediction value and the second prediction value using a weighting matrix.

The deriving of the second prediction value may further include: positioning the reference sample; reconstructing the reference sample of the determined position; and deriving the second prediction value using the reconstructed reference sample.

The positioning of the reference sample may determine a predetermined fixed position as the position of the reference sample.

The positioning of the reference sample may further include: receiving position information on the position of the reference sample from an encoder; decoding the position information; and positioning the reference sample using the decoded position information.

The positioning of the reference sample may determine the reference sample using neighboring block information included in the reconstructed neighboring blocks, the reconstructed neighboring blocks being blocks adjacent to the current block and the neighboring block information being at least one of partition information, prediction direction information, and quantization parameter information of the reconstructed neighboring blocks.

The positioning of the reference sample may determine the reference sample using information on spatial variations of the neighboring samples adjacent to the current block.

The reconstructing of the reference sample may further include: receiving and decoding a residual signal for the reference sample from an encoder; deriving a third prediction value for the reference sample; and deriving a value of the reference sample by adding the decoded residual signal to the third prediction value.

The deriving of the third prediction value may include: deriving the third prediction value using at least one of the neighboring samples, the left upper corner samples, and the previously reconstructed reference sample.

At the deriving of the second prediction value, the second prediction value may be derived as the same value as the sample value of the reconstructed reference sample.

At the deriving of the second prediction value, the second prediction value may be derived by a weighting sum of a sample value of the reconstructed reference sample and a sample value of the neighboring sample.

When the number of reference samples is two or more, the deriving of the second prediction value may further include: separating the current block into a plurality of regions each including one reference sample; and deriving the sample value of the reference sample existing in the current region among the plurality of separated regions as the second prediction value for the current region.

The weighting matrix may be determined based on a size of the current block or a prediction direction for the current block.

The weighting matrix may be a predetermined fixed weighting matrix.

The deriving of the final prediction value may include: adaptively updating the weighting matrix; and performing a weighting sum of the first prediction value and the second prediction value by using the updated weighting matrix.

Advantageous Effects

The video encoding method according to the exemplary embodiments of the present invention can improve the video encoding/decoding efficiency.

Further, the video decoding method according to the exemplary embodiments of the present invention can improve the video encoding/decoding efficiency.

The intra prediction method according to the exemplary embodiments of the present invention can improve the video encoding/decoding efficiency.

DESCRIPTION OF DRAWINGS

FIG. 4 is a conceptual diagram schematically showing a method for deriving a first prediction value according to an exemplary embodiment of the present invention.

FIG. 7 is a conceptual diagram schematically showing a method for positioning a reference sample according to another exemplary embodiment of the present invention.

FIG. 9 is a conceptual diagram schematically showing a method for determining a reference sample value according to an exemplary embodiment of the present invention.

FIG. 10 is a conceptual diagram for explaining a method for encoding a reference sample according to the exemplary embodiment of the present invention.

MODE FOR INVENTION

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. Further, in the present invention, "comprising" a specific configuration will be understood that additional configuration may also be included in the embodiments or the scope of the technical idea of the present invention.

Terms used in the specification, 'first', 'second', etc. can be used to describe various components, but the components are not to be construed as being limited to the terms. The terms are only used to differentiate one component from other components. For example, the 'first' component may be named the 'second' component without being departed from the scope of the present invention and the 'second' component may also be similarly named the 'first' component.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Figure 1:
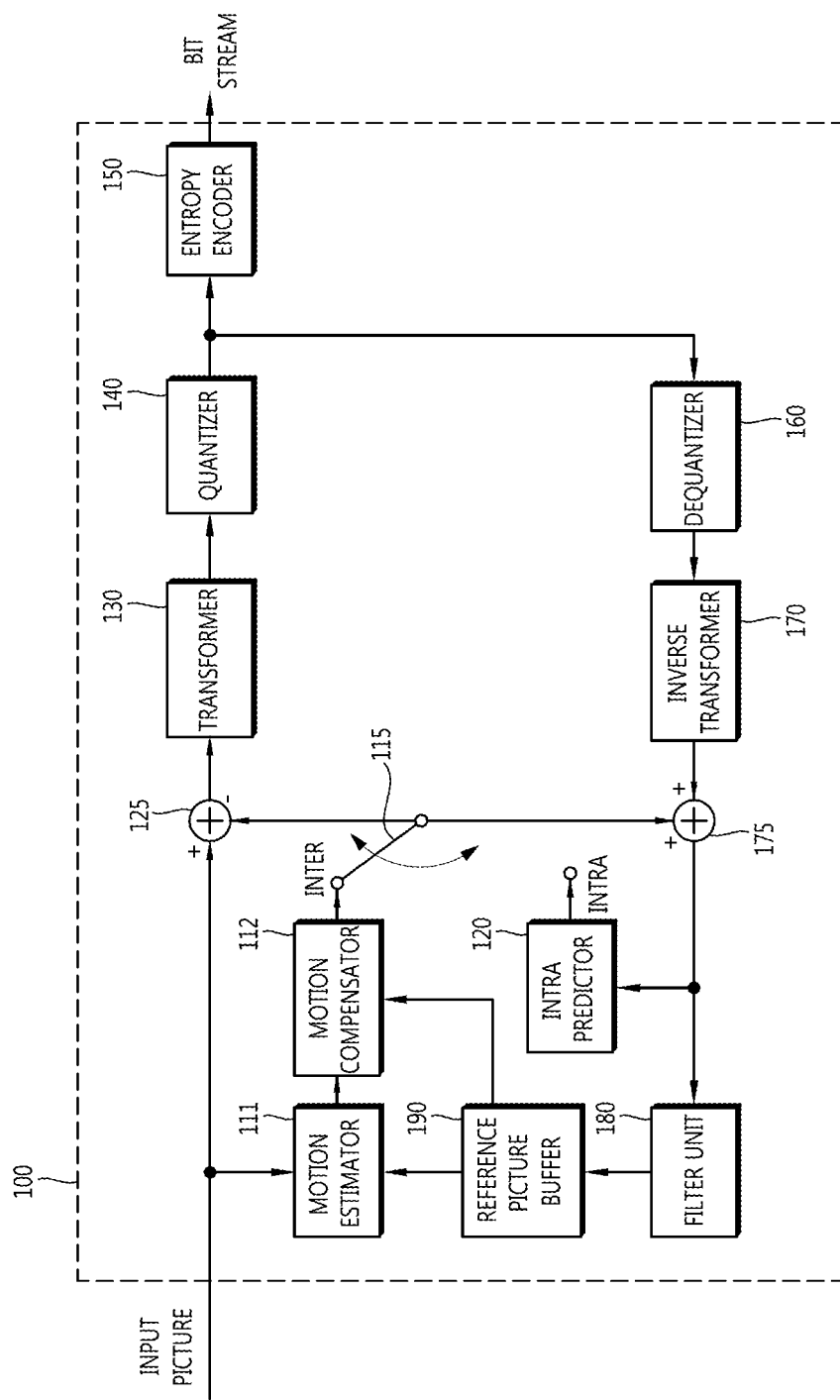
FIG. 1 is a block diagram showing a configuration of an video encoding apparatus to according to an exemplary embodiment of the present invention.

FIG. 1 is a block diagram showing a configuration of a video encoding apparatus to according to an exemplary embodiment of the present invention.

Referring to FIG. 1, a video encoding apparatus 100 includes a motion estimator 111, a motion compensator 112, an intra predictor 120, a switch 115, a subtractor 125, a transformer 130, a quantizer 140, an entropy encoder 150, a dequantizer 160, an inverse transformer 170, an adder 175, a filter unit 180, and a reference picture buffer 190.

The video encoding apparatus 100 may perform encoding on input images with an intra mode or an inter mode to output bitstreams. The intra prediction means intra-picture prediction and the inter prediction means inter-picture prediction. In the case of the intra mode, the switch 115 may be switched to intra and in the case of the inter mode, the switch 115 may be switched to inter. The video encoding apparatus 100 may generate a prediction block for an input block of the input images and then, encode residuals between the input block and the prediction block.

In the case of the intra mode, the intra predictor 120 may perform spatial prediction using the sample values of the previously encoded blocks around the current block to generate the prediction block.

In the case of the inter mode, the motion estimator 111 may obtain a motion vector by searching a region optimally matched with the input block in a reference picture stored in the reference picture buffer 190 during a motion prediction process. The motion compensator 112 may perform the motion compensation by using the motion vector to generate the prediction block.

The subtractor 125 may generate a residual block due to the residuals of the input block and the generated prediction block. The transformer 130 may output transform coefficients by performing a transform on the residual block. Further, the quantizer 140 may quantize the input transform coefficient according to quantization parameters to output quantized coefficients.

The entropy encoder 150 may perform entropy encoding based on values calculated in the quantizer 140 or encoding parameter values, or the like, calculated during the encoding process to output bitstreams.

When the entropy encoding is applied, the entropy encoding may represent symbols by allocating a small number of bits to the symbols having high occurrence probability and allocating a large number of bits to the symbols having low occurrence probability to reduce a size of the bitstreams for the symbols to be encoded. Therefore, the compression performance of the video encoding may be increased through the entropy encoding. For the entropy encoding, an encoding method such as exponential golomb, context-adaptive variable length coding (CAVLC), context-adaptive binary arithmetic coding (CABAC), or the like, may be used.

The video encoding apparatus according to the exemplary embodiment of FIG. 1 performs the inter prediction encoding, that is, the inter-picture prediction encoding and thus, the current encoded picture needs to be decoded and stored so as to be used as the reference picture. Therefore, the quantized coefficient may be dequantized in the dequantizer 160 and inversely transformed in the inverse transformer 160. The dequantized, inverse transformed coefficients are added to the prediction block through the adder 175 and a reconstructed block is generated.

The reconstructed block passes through the filter unit 180 and the filter unit 180 may apply at least one of a deblocking filter, sample adaptive offset (SAO), and an adaptive loop filter to the reconstructed block or a reconstructed picture. The filter unit 180 may be referred to as an adaptive in-loop filter (ALF). The deblocking filter may remove a block distortion generated at a boundary between the blocks. The SAO may add a proper offset value to the sample values so as to compensate for coding error. The ALF may perform the filtering based on a value obtained by comparing the reconstructed picture with an original picture and may be also performed only when the high efficiency is applied. The reconstructed block passing through the filter unit 180 may be stored in the reference picture buffer 190.

Figure 2:
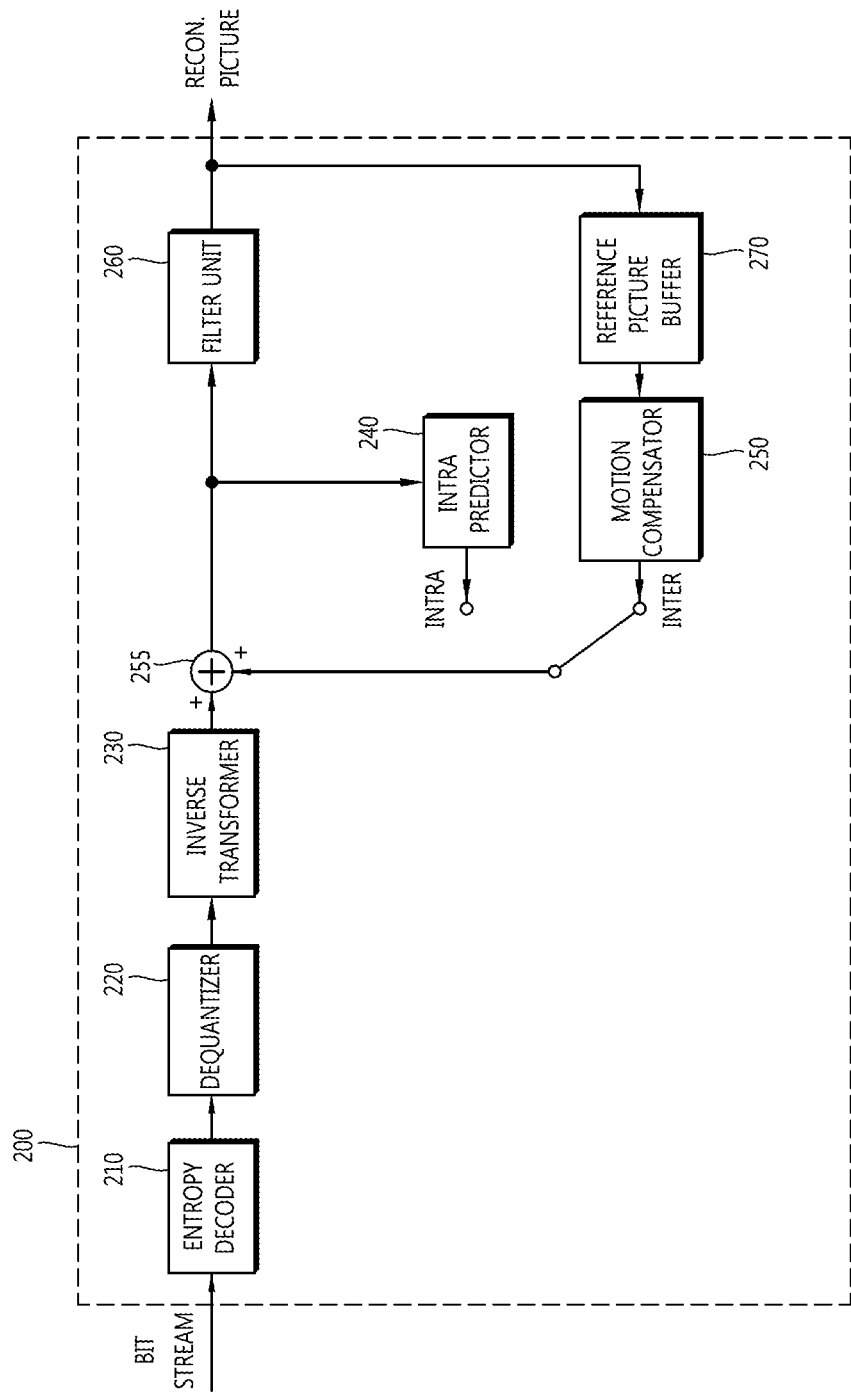
FIG. 2 is a block diagram showing a configuration of an video decoding apparatus to according to an exemplary embodiment of the present invention.

FIG. 2 is a block diagram showing a configuration of a video decoding apparatus to according to an exemplary embodiment of the present invention.

Referring to FIG. 2, a video decoding apparatus 200 includes an entropy decoder 210, a dequantizer 220, an inverse transformer 230, an intra predictor 240, a motion compensator 250, an adder 255, a filter unit 260, and a reference picture buffer 270.

The video decoding apparatus 200 may receive the bitstreams output from the encoder to perform the decoding with the intra mode or the inter mode and output the reconstructed image, that is, the reconstructed image. In the case of the intra mode, the switch may be switched to the intra and in the case of the inter mode, the switch may be switched to the inter mode. The video decoding apparatus 200 obtains the residual block from the received bitstreams and generates the prediction block and then, add the residual block and the prediction block, thereby generating the reconstructed block, that is, the reconstructed block.

The entropy decoder 210 may perform the entropy encoding on the input bitstreams according to the probability distribution to generate the symbols having the quantized coefficient type of symbols. The entropy decoding method is similar to the above-mentioned entropy encoding method.

When the entropy decoding method is applied, a small number of bits are allocated to the symbols having high occurrence probability and a large number of bits are allocated to the symbols having low occurrence probability to represent the symbols, thereby reducing a size of the bitstreams for each symbol. Therefore, the compression performance of the video decoding may also be increased through the entropy decoding method.

The quantized coefficients are dequantized in the dequantizer 220 and are inversely transformed in the inverse transformer 230. The quantized coefficients may be dequantized/inversely transformed to generate the residual block.

In the case of the intra mode, the intra predictor 240 may perform spatial prediction using the sample values of the previously encoded blocks around the current block to generate the prediction block. In the case of the inter mode, the motion compensator 250 performs the motion compensation by using the motion vector and the reference picture stored in the reference picture buffer 270, thereby generating the prediction block.

The residual block and the prediction block are added through the adder 255 and the added block passes through the filter unit 260. The filter unit 260 may apply at least one of the deblocking filter, the SAO, and the ALF to the reconstructed block or the reconstructed picture. The filter unit 260 outputs the reconstructed images, that is, the reconstructed images. The reconstructed image may be stored in the reference picture buffer 270 so as to be used for the inter prediction.

Hereinafter, the block means a unit of the image encoding and decoding. At the time of the image encoding and decoding, the coding or decoder means the divided unit when performing the encoding and decoding by dividing the pictures, which may be called a coding unit (CU), a coding block (CB), a prediction unit (PU), a prediction block (PB), a transform unit (TU), a transform block (TB), or the like. The single block may be subdivided into a lower block having a smaller size. In addition, in the exemplary embodiments to be described below, the current block may mean the block to be encoded and/or the current block to be decoded.

In addition, the blocks adjacent to the current block may be referred to as the neighboring block, the blocks adjacent to the upper end of the current block may be referred to as the upper neighboring block, and the blocks adjacent to the left of the current block may be referred to as the left neighboring block. Further, the samples adjacent to the current blocks may be referred to as the neighboring samples, the samples adjacent to the upper end of the current block may be referred to as the upper neighboring samples, and the samples adjacent to the left of the current block may be referred to as the left neighboring samples.

Meanwhile, the intra prediction may be performed using the reconstructed neighboring samples adjacent to the current block. In this case, the directional prediction may be used. When the intra prediction is performed in each prediction mode using the directional prediction, as the samples are far away from the reconstructed neighboring samples among the samples in the current block, the samples may have large prediction errors. The prediction error may also affect the blocks encoded after the current block and may cause the degradation in image quality and the degradation in the coding efficiency.

Therefore, in order to reduce the prediction errors increased as the distance from the reconstructed neighboring samples is increased; the intra prediction method and apparatus using the reference sample within the current block may be provided.

Figure 3:
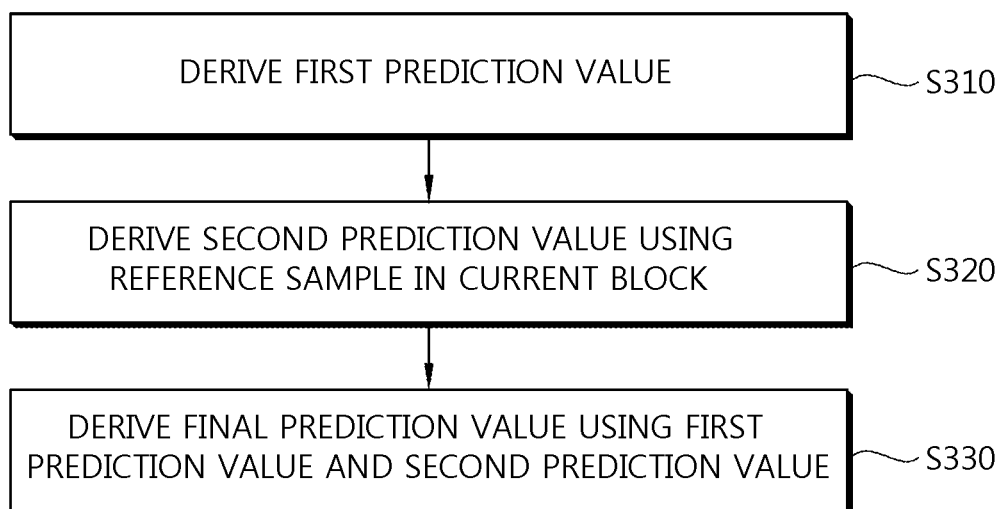
FIG. 3 is a flow chart schematically showing an intra prediction method in an encoder according to an exemplary embodiment of the present invention.

FIG. 3 is a flow chart schematically showing an intra prediction method in an encoder according to an exemplary embodiment of the present invention. Hereinafter, a first prediction value may mean a prediction value derived using only the reconstructed neighboring sample and a second prediction value may mean the prediction value derived using the reconstructed neighboring samples and the reference sample within the current block together.

Referring to FIG. 3, the encoder may derive the first prediction value for the current block (S310).

The encoder may derive the first prediction value using the sample values of the reconstructed neighboring samples. In this case, the used intra prediction method may be the directional prediction and/or the non-directional prediction. The prediction direction used for the directional prediction may be a vertical direction, a horizontal direction, a diagonal direction, or the like. The detailed exemplary embodiment of the method for deriving the first prediction value will be described below.

Referring again to FIG. 3, the encoder may use the reference sample within the current block to derive the second prediction value (S320).

The encoder may determine at least one reference sample within the current block and perform the intra prediction based on the determined reference sample to derive the second prediction value. The detailed exemplary embodiment of the method for deriving the second prediction value will be described below.

Herein, the process of deriving the first prediction value and the process of deriving the second prediction value may be performed in sequence different from the above-mentioned description or simultaneously. For example, the encoder may derive the second prediction value earlier than the first prediction value and the process of deriving the first prediction value and the process of deriving the second prediction value may be simultaneously performed.

When the first prediction value and the second prediction value are derived, the encoder may derive the final prediction value using the first prediction value and the second prediction value (S330). In this case, the encoder may derive the final prediction value for the samples within the current block by the weighting sum of the first prediction value and the second prediction value. The detailed exemplary embodiment of the method for deriving the final prediction value using the weighting value will be described below.

Figure 4:
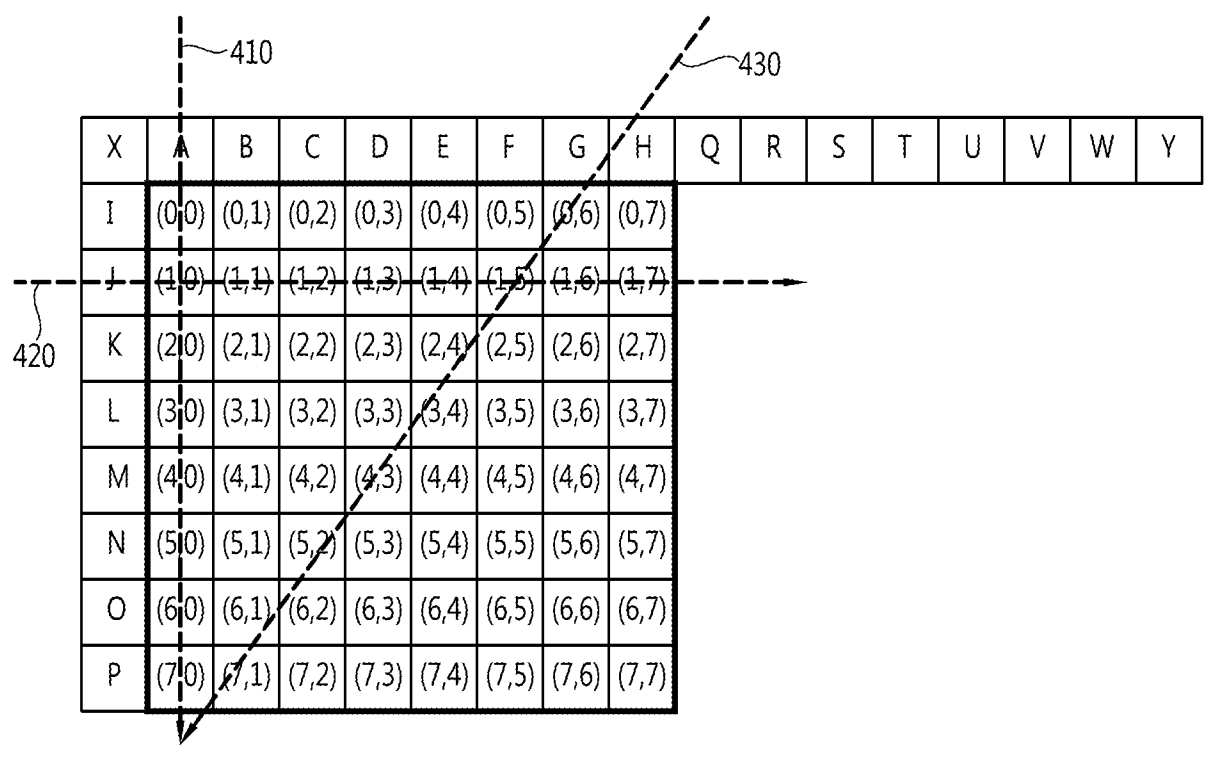

FIG. 4 is a conceptual diagram schematically showing a method for deriving a first prediction value according to an exemplary embodiment of the present invention. A size of the current block subjected to the intra prediction may be 4×4, 8×8, 16×16, 32×32, 64×64, and 128×128. FIG. 4 shows the embodiment of the case in which the size of the current block is 8×8. (x, y) represented in the current block means the coordinates of the sample within the current block.

A to Y represent the reconstructed neighboring samples and may be used for the intra prediction of the current block. Further, an X sample positioned at the left upper corner of the current block may be used for the intra prediction of the current block. In this case, the encoder may perform the intra prediction in a vertical direction 410, a horizontal direction 420, or a diagonal direction 430. Here, the number of prediction direction and/or the prediction method, or the like, may be variously defined.

Referring to FIG. 4, the encoder may perform the intra prediction in the vertical direction 410. In this case, the used neighboring sample may be one of A to H that are the upper neighboring samples. For example, p(0,0)=p(1,0)=p(2,0)=p(3,0)=p(4,0)=p(5,0)=p(6,0)=p(7,0)=A. Here, p(x, y) may represent the first prediction value for the sample of position (x, y) among the samples within the current block. In addition, A may represent the sample values of A sample.

The encoder may also perform the intra prediction in the horizontal direction 420. In this case, the used neighboring samples may be one of I to P that are the left neighboring samples. For example, p(1,0)=p(1,1)=p(1,2)=p(1,3)=p(1,4)=p(1,5)=p(1,6)=p(1,7)=J. Here, J may represent the sample value of J sample.

The encoder may also perform the intra prediction in the diagonal direction 430. In this case, the encoder may perform the prediction using at least one reconstructed neighboring samples. For example, when the intra prediction is performed using two neighboring samples, the first prediction value may be obtained by the weighting sum of the two sample values.

As the exemplary embodiment, p(3, 4) may be obtained by the following Equation 1.

$$p(3,4)=(8*G+24*H+16)>>5 \quad \text{[Equation 1]}$$

Here, G may represent a sample value of a G sample and H may represent a sample value of an H sample.

Figure 5:
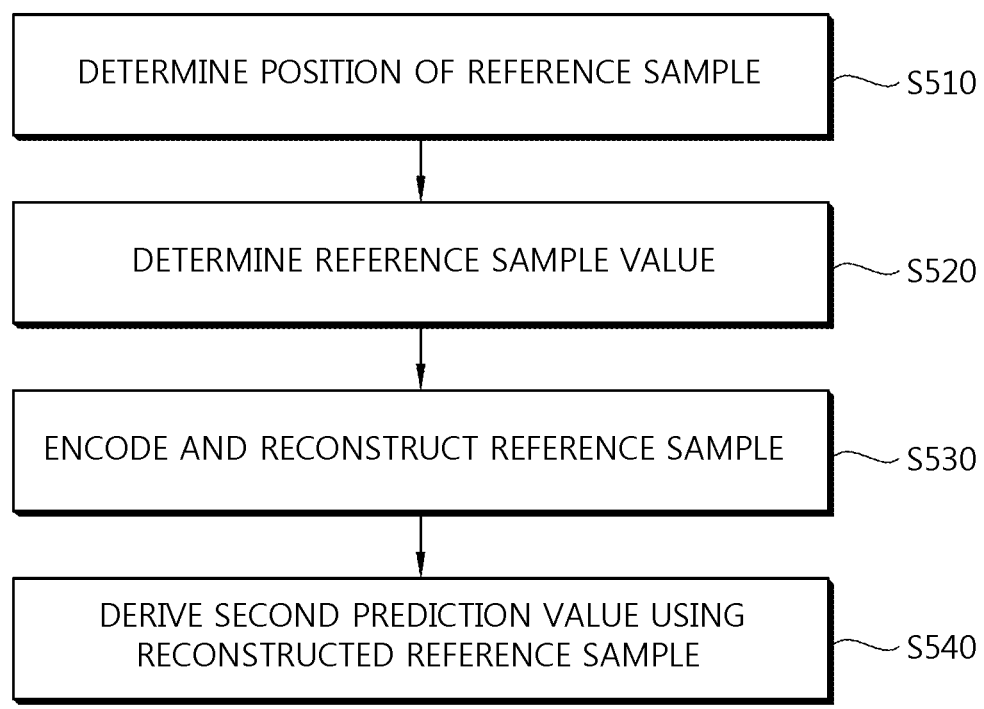
FIG. 5 is a flow chart schematically showing a method for deriving a second prediction value in the encoder according to an exemplary embodiment of the present invention.

FIG. 5 is a flow chart schematically showing a method for deriving a second prediction value in an encoder according to an exemplary embodiment of the present invention.

Referring to FIG. 5, the encoder may determine the position of the reference sample within the current block (S510).

For example, the encoder may determine the predetermined fixed position within the current block as the position of the reference sample. In addition, the encoder may determine a position at which the a predetermined cost function value is minimum as the position of the reference sample and the position of the reference sample using the information associated with the neighboring blocks adjacent to the current block. The detailed exemplary embodiment of the method for determining the reference sample position will be described below.

Referring again to FIG. 5, the encoder may determine the value of the reference sample (S520). The detailed exemplary embodiment of the method for determining the reference sample value will be described below.

When the position of the reference sample and the value of the reference sample are determined, the encoder may decode and reconstruct the reference sample (S530).

The encoder obtains the prediction value of the reference sample and then, the residual signal for the reference sample may be obtained by the residuals of the sample value and the prediction value of the reference sample. The encoder may encode the residual signal and transmit the encoded residual signal to the decoder. In addition, the encoder may reconstruct the reference sample from the encoded residual signal to obtain the reconstructed reference sample. The detailed exemplary embodiment of the process of encoding and reconstructing the reference sample will be described below.

When the reconstructed reference sample is obtained, the encoder may derive the second prediction value based on the reconstructed reference sample (S540). The detailed exemplary embodiment of the method for deriving the second prediction value using the reconstructed reference sample will be described below.

Figure 6:
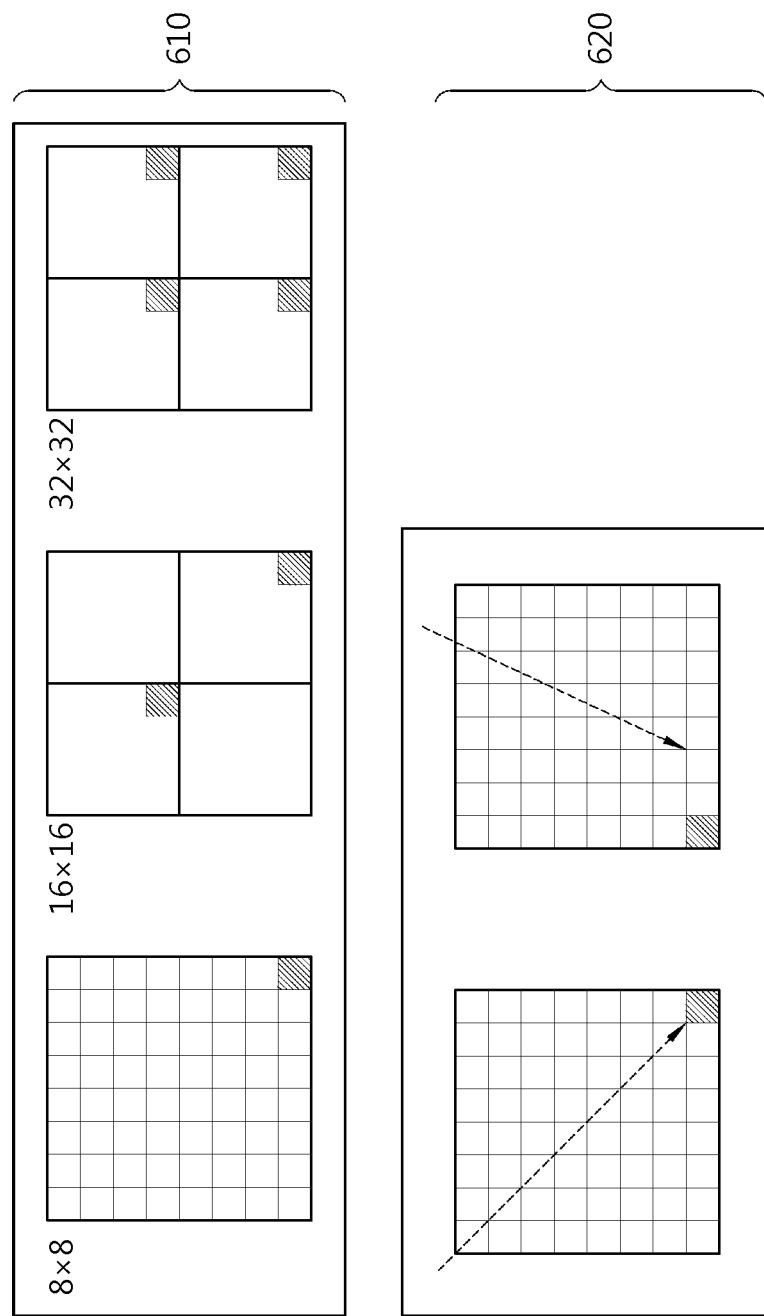
FIG. 6 is a conceptual diagram schematically showing a method for positioning a reference sample according to an exemplary embodiment of the present invention.

FIG. 6 is a conceptual diagram schematically showing a method for positioning a reference sample according to an exemplary embodiment of the present invention.

The encoder may determine the predetermined fixed position within the current block as the position of the reference sample. The position of the reference sample may be one or more. In this case, the decoder may determine the predetermined fixed position as the position of the reference sample and thus, the encoder may not transmit the information on the position of the reference sample to the decoder. In addition, since the predetermined fixed position is used, the encoder may not perform the separate calculation for obtaining the position information.

The number of predetermined fixed positions and/or reference samples may be differently defined according to the size of the current block and/or the prediction mode of the current block.

Referring to reference numeral 610 of FIG. 6, when the size of the current block is 8×8, the encoder may use one reference sample. In this case, the predetermined fixed position may be one. In addition, when the size of the current block is 16×16, the encoder may use two reference samples. In this case, the predetermined fixed position may be two. When the size of the current block is 32×32, the encoder may use four reference samples. In this case, the predetermined fixed position may be four. That is, the encoder may increase the number of reference samples to be used as the size of the current block is increased.

Referring to reference numeral 620 of FIG. 6, the encoder may use a position farthest away from the reconstructed neighboring samples used for the intra prediction as the predetermined fixed position according to the intra prediction mode and/or the prediction direction.

In the above-mentioned methods, the predetermined fixed position may be defined as the position having the largest prediction errors through training. As described above, the position having the largest prediction error is determined as the position of the reference sample to reduce the prediction errors occurring at the time of the intra prediction.

Meanwhile, the encoder may also determine the position at which the value of the predetermined cost function is minimal as the position of the reference sample among the reference sample position candidates within the current block. For example, the encoder may calculate the costs at the time of performing the intra prediction on each of the reference sample position candidates and may select the reference sample position candidates at which the calculated costs are minimal as the reference sample positions for the current block.

As the exemplary embodiment of the present invention, the predetermined cost function may be a cost function based on a rate distortion optimization (RDO) method. In this case, the encoder may calculate the cost function value by the following Equation 2.

$$\text{Cost}=\text{Distortion}(pos)+\text{lambda}*\text{Rate}(pos) \quad \text{[Equation 2]}$$

Here, Cost may represent the cost function value and pos may represent the position of the reference sample. In addition, Distortion may represent the distortion when the prediction is performed using the reference sample of the corresponding position pos and Rate may represent a bit rate when the prediction is performed using the reference sample of the corresponding position pos. Lambda is a variable used for calculating the cost function value and the encoder may derive the cost function value only by the Distortion when a lambda value is 0.

As another exemplary embodiment of the present invention, the predetermined cost function may be a cost function based on sum of absolute difference (SAD). In this case, the encoder may calculate the cost function value by the following Equation 3.

$$\text{Cost}=\Sigma|A-B(pos)| \quad \text{[Equation 3]}$$

Here, A may represent the original block and/or the reconstructed block and B may represent the predicted block according to the position of the reference sample.

As another exemplary embodiment of the present invention, the predetermined cost function may be the cost function based on sum of absolute transformed differences (SATD), sum of squared differences (SSD), or the like.

FIG. 7 is a conceptual diagram schematically showing a method for positioning a reference sample according to another exemplary embodiment of the present invention. In the exemplary embodiment of the present invention of FIG. 7, a horizontal direction represents an x-axis direction and a vertical direction represents a y-axis direction.

The encoder may determine the position of the reference sample by using the information associated with the neighboring blocks adjacent to the current block.

As the exemplary embodiment of the present invention, referring to reference numeral 710 of FIG. 7, the encoder analyzes the value of the reconstructed neighboring sample 712 to determine the position of the reference sample within the current block 714. In this case, the encoder may determine the position of at least one reference sample based on the spatial variation of the neighboring sample value. Reference numeral 716 of FIG. 7 may represent bodies and/or objects existing in a current picture. In this case, the difference between the sample values, that is, the spatial variation may be large at the boundary between the bodies and/or the objects 716. Therefore, the difference of the sample value may be large between the samples present around the boundary of the bodies and/or the objects 716 among the reconstructed neighboring samples 712.

For example, the encoder may obtain a point at which the difference in the sample value between the samples adjacent to each other among the upper neighboring samples is above the predetermined threshold value. For example, the obtained point may be a point corresponding to the boundary of the bodies and/or the objects 716 within the current picture. Here, the x-axis directional coordinate of the obtained point may be referred to as an X. In addition, the encoder may obtain a point at which the difference in the sample value between the samples adjacent to each other among the left neighboring samples is above the predetermined threshold value. For example, the obtained point may be a point corresponding to the boundary of the bodies and/or the objects 716 within the current picture. Here, the y-axis directional coordinate of the obtained point may be referred to as a Y. In this case, the decoder may determine the (X, Y) point as the position of the reference sample. That is, the encoder may determine a point at which a vertical direction straight line passing through the point obtained using the upper neighboring samples meets the horizontal direction straight line passing through a point obtained using the left neighboring samples as the position of the reference sample.

As another exemplary embodiment of the present invention, the position of the reference sample may determine using the encoding related information of the reconstructed neighboring blocks. Here, the decoding related information of the reconstructed neighboring blocks may include the partition information, the prediction directional information, the quantization parameter information, or the like, of the neighboring blocks.

Referring to reference numeral 720 of FIG. 7, the encoder may search the partition division point for the upper neighboring block. Here, the x-axis directional coordinate of the obtained point may be referred to as an X. In addition, the encoder may search the partition division point for the left neighboring block. Here, the y-axis directional coordinate of the obtained point may be referred to as a Y. In this case, the encoder may determine the (X, Y) point as the position of the reference sample. That is, the encoder may determine a point at which a vertical direction straight passing through the division point for the upper neighboring blocks meets the horizontal direction straight passing through the division point for the left neighboring blocks as the position of the reference sample.

Referring to reference numeral 730 of FIG. 7, the encoder may obtain the point at which the blocks having different prediction directions among the upper neighboring blocks are adjacent to one another. Here, the x-axis directional coordinate of the obtained point may be referred to as an X. In addition, the encoder may obtain the point at which the blocks having different prediction directions among the left neighboring blocks are adjacent to one another. Here, the y-axis directional coordinate of the obtained point may be referred to as a Y. In this case, the encoder may determine the (X, Y) point as the position of the reference sample. That is, the encoder may determine a point at which a vertical direction straight passing through the obtained point for the upper neighboring blocks meets the horizontal direction straight passing through the obtained point for the left neighboring blocks as the position of the reference sample.

When the position of the reference sample is determined by the above-mentioned method, the encoder may encode the position of the determined reference sample and transmit the encoded reference sample to the decoder.

Figure 8:
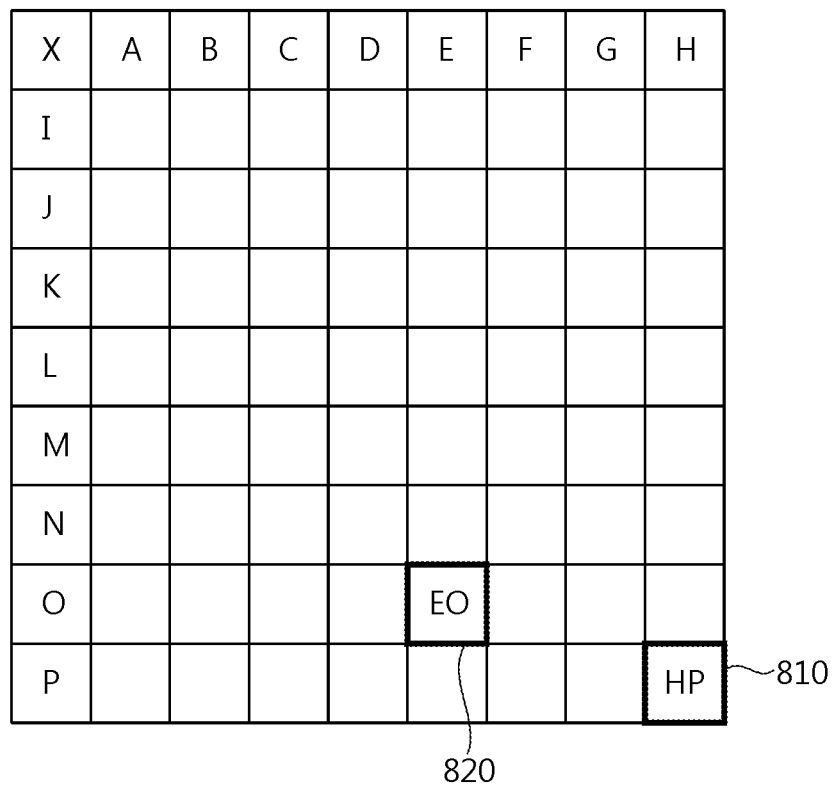
FIG. 8 is a conceptual diagram schematically showing a method for encoding a reference sample position according to an exemplary embodiment of the present invention.

FIG. 8 is a conceptual diagram schematically showing a method for encoding a reference sample position according to an exemplary embodiment of the present invention.

The position of the reference sample may be represented by various methods. For example, the specific position within the current block may be represented by the coordinate values that are the reference point. Referring to FIG. 8, the position of the reference point may be the same as the sample 810 (HP) of the rightmost lower end within the current block. In this case, the position of the determined reference sample 820 (EO) may be coordinate values (1, 3). Here, 1 may represent a position moved by 1 sample upwardly from the reference point and 3 may represent a position moved by 3 samples in a left direction from the reference point. The method for defining the reference point and/or the coordinate values is not limited to the above-mentioned exemplary embodiment and therefore, may be variously defined as an implementation manner and/or as needed.

When the coordinate values are determined, the determined coordinate values may be decoded. In this case, the encoder may transmit the encoded coordinate values to the decoder.

Meanwhile, as described above with reference to FIG. 5, the encoder may determine the sample value of the reference sample.

FIG. 9 is a conceptual diagram schematically showing a method for determining a reference sample value according to an exemplary embodiment of the present invention. FIG. 9 shows the exemplary embodiments of the case in which the size of the current block is 8×8.

As the exemplary embodiment of the present invention, the encoder may determine the sample value of the original sample existing at the same position as the position of the determined reference sample as the reference sample value for the current block. For example, in FIG. 9, when the position of the reference sample is as HP 910, the sample value of the original sample existing at the HP position may be determined as the sample value of the reference sample. Hereinafter, the original sample existing at the same position as the reference sample position may be referred to as the co-position original sample.

As another exemplary embodiment of the present invention, the encoder may determine an average value of the sample value of the co-position original sample and the sample values of the original sample positioned around the co-position original sample as the reference sample value for the current block. Here, the original samples positioned around the co-position original sample may be the samples adjacent to the co-position original sample. Hereinafter, the original sample positioned around the co-position original sample may be referred to as the neighboring original sample.

For example, in FIG. 9, when the position of the reference sample is determined as the HP 910, the average value of the co-position original sample and the neighboring original sample may be calculated by the following Equation 4.

$$(GO+HO+GP+HP+2) >> 2 \qquad [\text{Equation 4}]$$

Here, the number and/or position of neighboring original samples may be set as the predetermined number and/or position and may be changed according to the prediction direction. For example, the value of the reference sample may be derived by the following Equation 5.

$$(HO+FP+GP+HP+2) >> 2 \qquad [\text{Equation 5}]$$

or $$(GN+HN+FO+GO+HO+FP+GP+HP+4) >> 3$$

When the position of the reference sample and the value of the reference sample are determined, the encoder may decode and reconstruct the reference sample.

Figure 10:
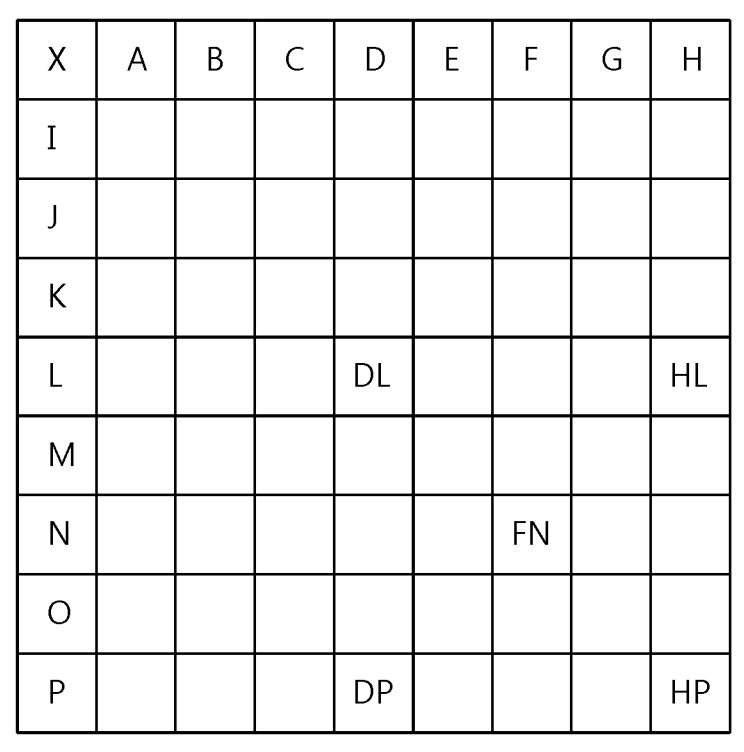

FIG. 10 is a conceptual diagram for explaining a method for encoding a reference sample according to the exemplary embodiment of the present invention.

The encoder may obtain the prediction value of the reference sample. The prediction value of the reference sample may be referred to as the prediction reference sample. The prediction reference sample may be used for encoding the reference sample. Hereinafter, the exemplary embodiment of the method for deriving the prediction reference sample will be described with reference to FIG. 10.

For example, the encoder may derive the sample value of the prediction reference sample by the average of the sample values of the reconstructed neighboring samples. This may be, for example, represented by the following Equation 6.

$$\text{Predicted } (HP) = (TA+TB+TC+TD+TE+TF+TG+TH+ \\ LI+LJ+LK+LL+LM+LN+L\ O+LP+8) >> 4 \qquad [\text{Equation 6}]$$

Here, Predicted (x) may represent the prediction value of the reference sample positioned at x. In addition, T may represent the upper neighboring sample adjacent to the upper end of the current block and L may represent the left neighboring sample adjacent to the left of the current block.

As another exemplary embodiment of the present invention, the encoder may derive the sample value of the prediction reference sample by the average of the sample having the same coordinates on the x axis as the reference sample among the reconstructed upper neighboring samples and the sample value having the samples having the same coordinates on the y axis as the reference sample among the reconstructed neighboring samples. That is, the encoder may derive the sample value of the prediction reference sample by the average of the sample values of the samples existing on the same vertical line as the reference sample among the reconstructed upper neighboring samples and the samples existing on the same horizontal line as the reference sample among the reconstructed left neighboring samples. When the position of the reference sample is HP, the sample value of the prediction reference sample may be represented by the following Equation 7.

$$\text{Predicted }(HP)=(TH+LP+1)>>1 \qquad [\text{Equation 7}]$$

As another exemplary embodiment of the present invention, the encoder may select the predetermined fixed sample as the prediction value of the reference sample among the reconstructed neighboring samples. When the predetermined fixed sample is TH, the prediction value of the reference sample may be calculated by the following Equation 8.

$$\text{Predicted }(HP)=TH \qquad [\text{Equation 8}]$$

When the predetermined fixed sample is LP, the prediction value of the reference sample may be calculated by the following Equation 9.

$$\text{Predicted }(HP)=LP \qquad [\text{Equation 9}]$$

As another exemplary embodiment of the present invention, when the plurality of reference samples is present for the current block, the encoder may derive the prediction value of the current reference sample using the previously encoded and reconstructed reference sample. This may be, for example, represented by the following Equation 10.

$$\text{Predicted }(DL)=\text{Reconstructed }(HP) \qquad [\text{Equation 10}]$$

or $$\text{Predicted }(FN)=(\text{Reconstructed }(DL)+\text{Reconstructed }(HP)+1)>>1$$

Here, Reconstructed (x) may represent the sample value of the previously encoded and reconstructed reference sample positioned at x.

As another exemplary embodiment of the present invention, when the plurality of reference samples are present for the current block, the encoder may derive the prediction value of the current reference sample using the reconstructed left upper corner sample (X), the reconstructed neighboring sample, and/or the previously encoded and reconstructed reference sample. This may be, for example, represented by the following Equation 11.

$$\text{Predicted }(DL)=(X+\text{Reconstructed }(HP)+1)>>1$$

$$\text{Predicted }(DL)=(X+TD+LL+\text{Reconstructed }(HP)+2)>>2 \qquad [\text{Equation 11}]$$

When the prediction reference sample is obtained by the above-mentioned method, the encoder may obtain the residual signal for the reference sample by the residuals of the sample value of the reference sample and the sample value of the prediction reference sample. The method for deriving the residual signals may be, for example, represented by the following Equation 12.

$$\text{Difference }(HP)=\text{Predicted }(HP)-HP \qquad [\text{Equation 12}]$$

Here, the HP may represent the sample value of the reference sample and the Predicted (HP) may represent the sample value of the prediction reference sample. In addition, the Difference (HP) may represent the residual signals.

The encoder may encode the derived residual signals. In this case, the encoder may directly encode the residual signals and may quantize the derived residual signals and then, encode the quantized residual signal. When the residual signal is quantized, the encoder may differently apply the step size according to the quantization parameter (QP).

In addition, when the plurality of reference samples is present for the current block, the encoder may decode the plurality of reference blocks together. For example, in FIG. 10, it is assumed that three reference samples are present for the current block and the positions of the reference samples each are HP, FN, and DL. In this case, the encoder may transform and encode the difference (HP), difference (FN), and difference (DL) together. As another exemplary embodiment of the present invention, in FIG. 10, it is assumed that four reference samples are present for the current block and the positions of the reference samples each are DL, HL, DP, and HP. In this case, the encoder may transform and encode the difference (DL), the difference (HL), the difference (DP), and the difference (HP), together, by using the two-dimensional transform method such as a discrete cosine transform (DCT), or the like. The encoder may transmit the encoded residual signal to the decoder.

In addition, the encoder may reconstruct the reference sample from the encoded residual signal to obtain the reconstructed reference sample. The reconstructed reference sample may be used to derive the intra prediction and/or the second prediction value for the current block.

When the reconstructed reference sample is obtained by the above-mentioned method, the encoder may derive the second prediction value based on the reconstructed reference sample.

Figure 11:
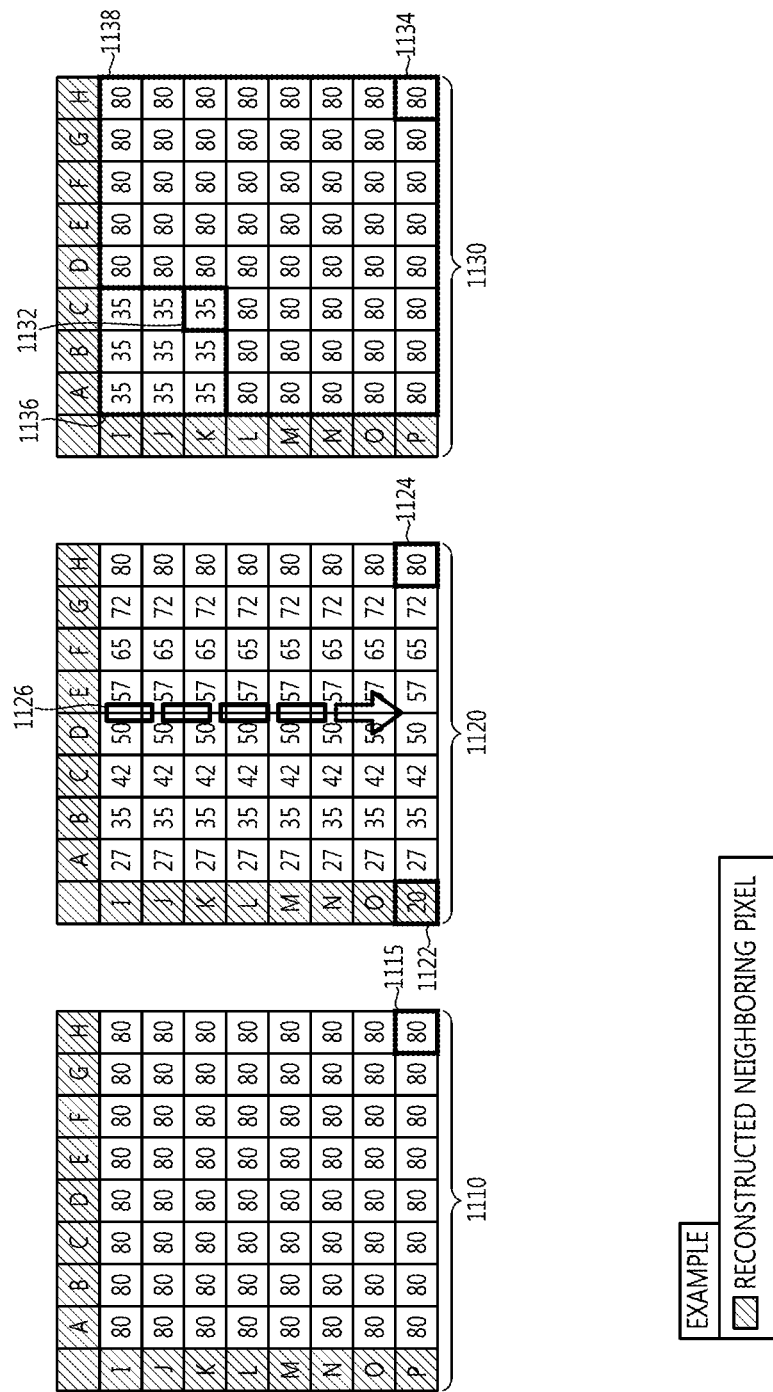
FIG. 11 is a conceptual diagram schematically showing a method for deriving a second prediction value for a current block using a reconstructed reference sample according to the exemplary embodiment of the present invention.

FIG. 11 is a conceptual diagram schematically showing a method for deriving a second prediction value for a current block using a reconstructed reference sample according to the exemplary embodiment of the present invention.

Reference numeral 1110 of FIG. 11 shows the exemplary embodiment of the method for deriving the second prediction value when one reconstructed reference sample is present for the current block. Referring to reference numeral 1110 of FIG. 11, the sample value of the reconstructed reference value 1115 (HP) is 80. In this case, the second prediction value of all the samples existing in the current block may be 80.

Reference numeral 1120 of FIG. 11 shows another exemplary embodiment of the method for deriving the second prediction value when one reconstructed reference sample is present for the current block. At reference numeral 1120 of FIG. 11, the prediction direction for the current block is assumed to be the vertical direction 1126.

Referring to reference numeral 1120 of FIG. 11, the encoder may predict the sample values within the current block by the weighting sum between the sample value of the reconstructed neighboring sample and the sample value of the reconstructed reference sample. If the sample value of the lowest sample 1122 among the reconstructed left neighboring samples is 20 and the sample value of the reconstructed reference sample 1124 is 80, the sample value of the samples existing between the two values may be predicted by the following Equation 13.

$$\text{second prediction value}=(d*20+(8-d)*80+4)>>3 \qquad [\text{Equation 13}]$$

Herein, d may represent the weight value allocated to the reconstructed neighboring sample and may represent the sample unit distance from the reconstructed reference sample to the sample to be predicted. In addition, the size of the current block is 8×8 and the unit of the weight of 8 may be used. The method for performing the process of the weighting sum between the sample value of the reconstructed neighboring samples and the sample value of the reconstructed reference sample is not limited to the above method and the weighting sum process may be performed in various methods as the implementation manner and/or as needed.

Reference numeral 1130 of FIG. 11 shows the exemplary embodiment of the method for deriving the second prediction value when two reconstructed reference samples are present for the current block. Referring to 1130 of FIG. 11, the reconstructed referenced samples may each be CK (1132) and HP (1134). It is assumed that the sample value of the reconstructed reference sample (CK) 1132 is 35 and the sample value of the reconstructed reference sample (HP) 1134 is 80.

When the plurality of reconstructed reference samples is present for the current block, the encoder may divide the current block into at least two regions and derive the second prediction value for each divided region. In addition, for example, the divided region may determine the position of the reconstructed reference sample as the reference.

For example, the encoder may divide the current block into the first region 1136 including the reconstructed reference sample (CK) 1132 and the second region 1138 including the reconstructed reference sample (HP) 1134. In this case, the second prediction value of the samples within the first region 1136 may be 35 that are equal to the sample value of the reconstructed reference sample (CK) 1132. In addition, the second prediction value of the samples within the second region 1138 may be 80 that are equal to the sample value of the reconstructed reference sample (HP) 1134.

As described above in FIG. 3, when the first prediction value and the second prediction value are derived, the encoder may derive the final prediction value using the derived first prediction value and second prediction value. In this case, the encoder may derive the final prediction value for the samples within the current block by the weighting sum of the first prediction value and the second prediction value.

The method for deriving the final prediction value by the weighting sum may be represented by the following Equation 14. In this case, the weighting value within the weighting matrix may be 0 or more and 1 or less.

Final prediction value $(x,y)=\{W(x,y)*\text{second prediction value }(x,y)+(1-W(x,y))*\text{first prediction value }(x,y)+1\}>>1$ [Equation 14]

Here, the final prediction value (x, y) may represent the final prediction value for the samples of the position (x, y) within the current block, the second prediction value (x, y) may represent the second prediction value for the sample of the position (x, y) within the current block, and the first prediction value (x, y) may represent the first prediction value for the sample of the position (x, y) within the current block. In addition, W(x, y) may represent the weighting value existing at the (x, y) position within the weighting matrix.

The weighting value within the weighting matrix may also be an integer number of 1 or more. In this case, the method for deriving the final prediction value by the weighting sum may be represented by the following Equation 15.

Final prediction value $(x,y)=\{W(x,y)*\text{second prediction value }(x,y)+(32-W(x,y))*\text{first prediction value }(x,y)+16\}>>5$ [Equation 15]

In this case, the weighting sum process may be performed with the accuracy of 1/32. The method for deriving the final prediction value by the weighting sum is not limited to the exemplary embodiment of the above-mentioned Equations 14 or 15 and the weighting sum process may be variously performed according to the implementation manner and/or as needed. For example, the weighting sum process may also be performed with the accuracy of 1/8, 1/16, or 1/64, or the like.

Figure 12:
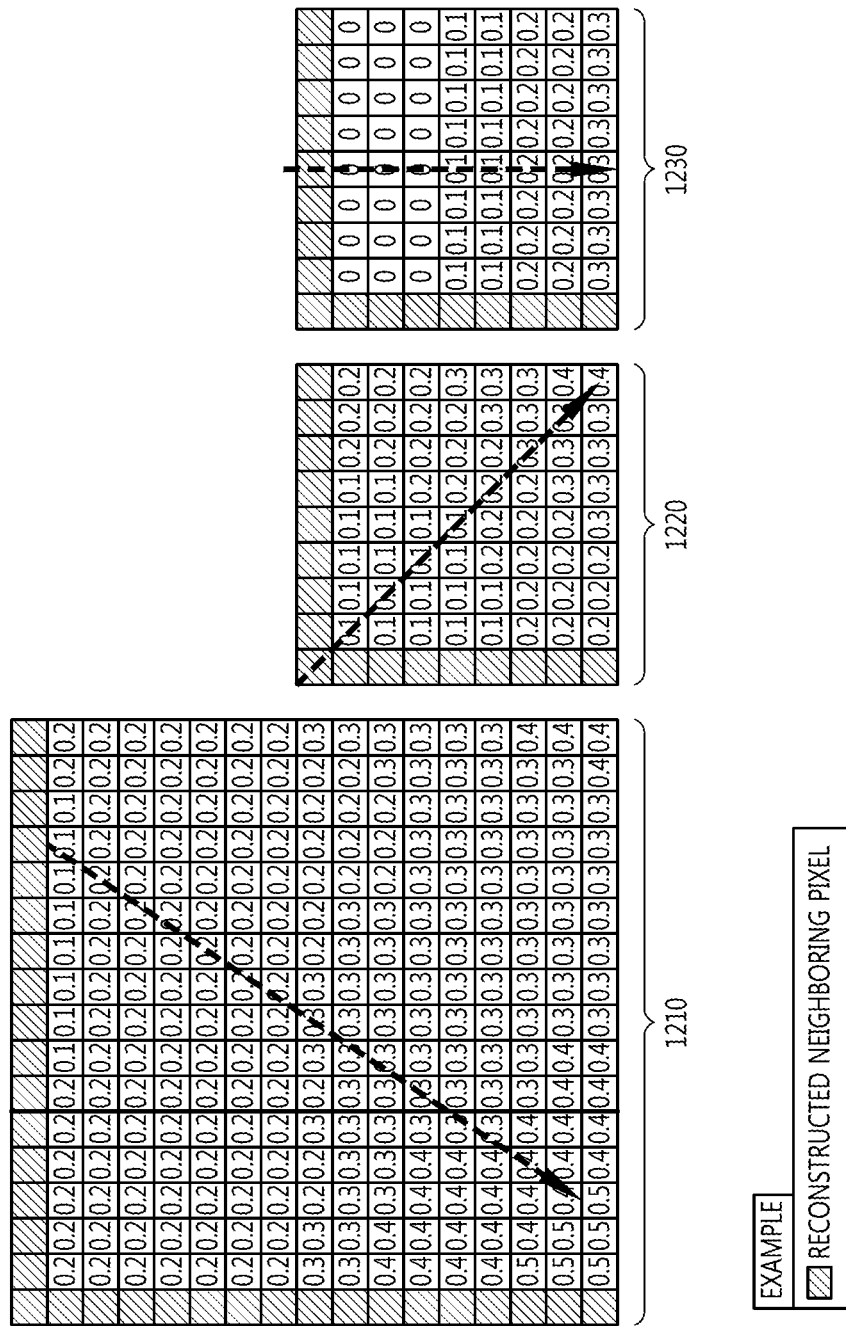
FIG. 12 is a conceptual diagram schematically showing a weighting matrix according to the exemplary embodiment of the present invention.

FIG. 12 is a conceptual diagram schematically showing a weighting matrix according to the exemplary embodiment of the present invention.

Reference numeral 1210 of FIG. 12, the size of the current block represents the exemplary embodiment of the weighting matrix of the case in which the size of the current block is 16×16 and reference numerals 1220 and 1230 of FIG. 12 show the exemplary embodiment of the weighting matrix of the case in which the size of the current block is 8×8. Arrows within each matrix represent the prediction direction for the current block.

Referring to FIG. 12, the encoder may differently determine the weighting matrix according to the size of the current block and/or the prediction direction for the current block, or the like. In this case, the initial weighting matrix may be determined through the training. For example, the encoder allocates the large weighting value to the second prediction value as the distance from the reconstructed neighboring samples used for the intra prediction is increased, thereby reducing the prediction errors.

In addition, as the exemplary embodiment of the present invention, the encoder may use the predetermined fixed weighting matrix according to the size of the current block and/or the prediction direction. The information on the predetermined fixed weighting matrix may be similarly stored in the decoder. In this case, the decoder can infer the information on the weighting matrix used in the encoder without the separate additional information and therefore, the encoder may not transmit the information on the weighting matrix to the decoder.

As another exemplary embodiment of the present invention, the encoder may adaptively update the weight matrix during the process of performing the intra prediction. For example, the encoder may generate the weight matrix set and then, select the optimal weight matrix within the generated weight matrix set. In addition, the encoder may adaptively update the weight values within the weight matrix. When the weight matrix is selected, the encoder may derive the final prediction value using the selected weight matrix. In this case, the encoder may encode the additional information identifying and/or indicating whether any weight matrix is selected in the weight matrix set and may the encoded additional information to the decoder.

According to the intra prediction method described in FIGS. 3 to 12, the prediction error may be reduced and the accuracy of the intra prediction can be improved, through the weighting sum of the first prediction value and the second prediction value. Therefore, the encoding efficiency can be improved.

Figure 13:
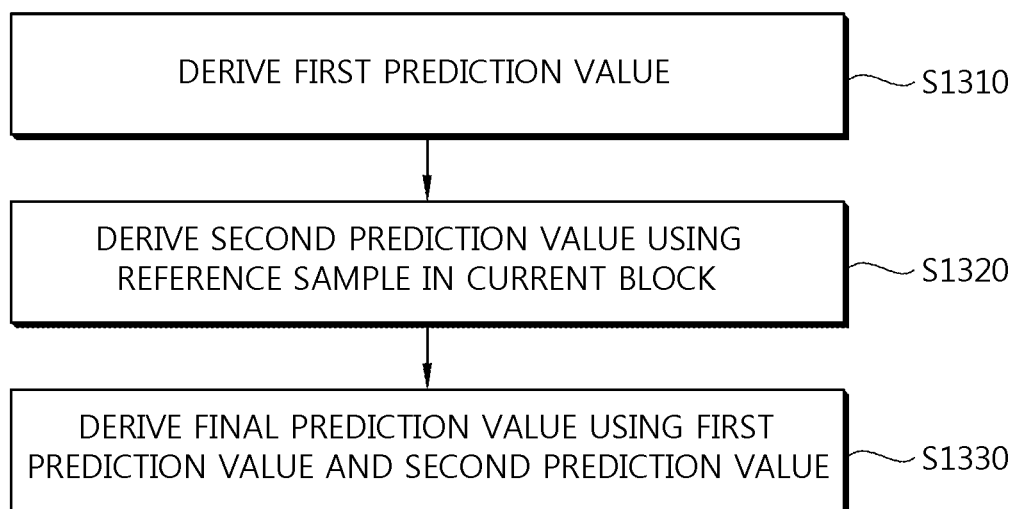
FIG. 13 is a flow chart schematically showing an intra prediction method in a decoder according to an exemplary embodiment of the present invention.

FIG. 13 is a flow chart schematically showing an intra prediction method in a decoder according to an exemplary embodiment of the present invention.

Referring to FIG. 13, the decoder may derive the first prediction value for the current block (S1310). In this case, the decoder may derive the first prediction value by the same method as in the encoder. The detailed exemplary embodiment of the method for deriving the first prediction value is described above and therefore, the description thereof will be omitted.

In addition, the decoder may derive the second prediction value using the reference sample within the current block (S1320). The decoder may determine the position of the reference sample and may reconstruct the reference sample of the determined position. When the reference sample is reconstructed, the decoder may derive the second prediction value using the reconstructed reference sample. The detailed exemplary embodiment of the method for deriving the second prediction value will be described in FIG. 14.

Herein, the process of deriving the first prediction value and the process of deriving the second prediction value may be performed in sequence different from the above-mentioned description or simultaneously. For example, the decoder may derive the second prediction value earlier than the first prediction value and the process of deriving the first prediction value and the process of deriving the second prediction value may be simultaneously performed.

When the first prediction value and the second prediction value are derived, the decoder may derive the final prediction value using the derived first prediction value and second prediction value (S1330).

For example, the decoder may derive the final prediction value for the samples within the current block by the weighting sum of the first prediction value and the second prediction value. In this case, the decoder may derive the final prediction value by the same method as in the encoder and may use the weighting matrix for calculating the weighting sum of the first prediction value and the second prediction value.

As the exemplary embodiment of the present invention, the decoder may use the predetermined fixed weighting matrix. In this case, the information on the predetermined fixed weighting matrix may be similarly stored in the encoder and the decoder. Therefore, the decoder may use the same weighting matrix as one used in the encoder without the separate additional information.

As another exemplary embodiment of the present invention, the decoder may adaptively update the weight matrix during the process of performing the intra prediction. For example, the decoder may generate the weight matrix set and then, select the optimal weight matrix within the generated weight matrix set. In addition, the decoder may adaptively update the weight values within the weight matrix. When the weight matrix is selected, the decoder may derive the final prediction value using the selected weight matrix.

As described above in FIG. 12, when the encoder adaptively uses the weighting matrix, the encoder may encode the additional information associated with the update of the weighting matrix and may the encoded additional information to the decoder. For example, the additional information may include the identifier, or the like, indicating whether any weighting matrix is selected in the weighting matrix set. In this case, the decoder may receive and decode the additional information and may use the decoded additional information in the update of the weighting matrix.

Figure 14:
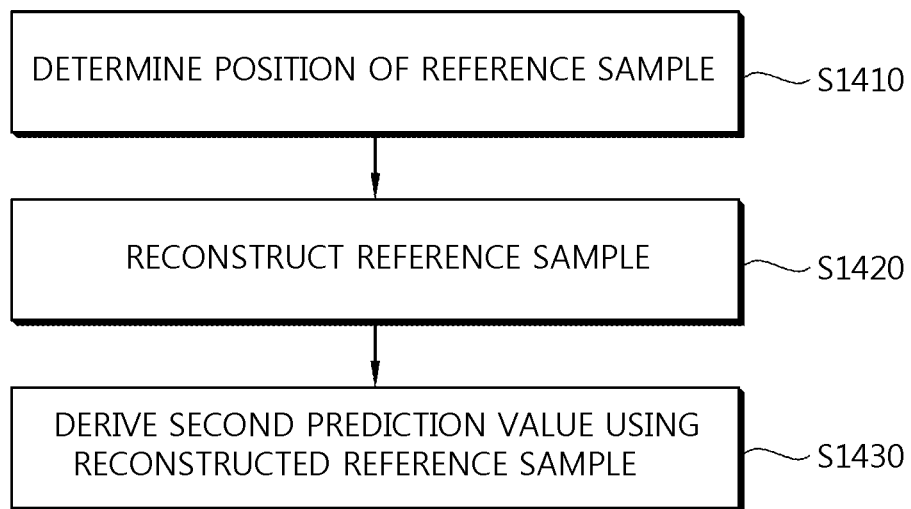
FIG. 14 is a flow chart schematically showing a method for deriving a second prediction value in the decoder according to an exemplary embodiment of the present invention.

FIG. 14 is a flow chart schematically showing a method for deriving a second prediction value in the decoder according to an exemplary embodiment of the present invention.

Referring to FIG. 14, the decoder may determine the position of the reference sample (S1410).

For example, the decoder may determine the predetermined fixed position within the current block as the position of the reference sample. In this case, the information on the predetermined fixed position may be similarly stored in the encoder and the decoder. Therefore, the decoder may determine the position of the reference sample similar to the encoder without the separate additional information. The detailed exemplary embodiment of the method for determining the predetermined fixed position as the position of the reference sample is described in FIG. 6 and therefore, the detailed description thereof will be omitted.

As another exemplary embodiment of the present invention, the decoder may determine the position of the reference sample using the information on the position of the reference sample received from the encoder. As described above in FIG. 8, the encoder may encode the information on the position of the reference sample and may transmit the encoded information to the decoder. In this case, the decoder may parse and/or decode the information on the position of the reference sample from the bitstream and may determine the position of the reference sample by using the parsed and/or decoded information.

As another exemplary embodiment of the present invention, the decoder may also determine the position of the reference sample by using the information associated with the neighboring blocks adjacent to the current block. In this case, the decoder may determine the position of the reference sample by the same method as in the encoder. The detailed exemplary embodiment of the method for determining the reference sample using the neighboring block related information may be described above in FIG. 7 and the detailed description thereof will be omitted.

Referring again to FIG. 14, the decoder may reconstruct the reference sample of the determined position (S1420).

As described above, the encoder obtains the prediction value of the reference sample and then, the residual signal for the reference sample may be obtained by the residuals of the sample value and the prediction value of the reference sample. The encoder may encode the residual signal and transmit the encoded residual signal to the decoder. In this case, the decoder may parse and/or decode the residual signals from the bitstream and may reconstruct the reference sample using the parsed and/or decoded residual signals.

The encoder may obtain the prediction value of the reference sample. In this case, the decoder may derive the prediction value by the same method as in the encoder. The sample values of the reconstructed neighboring samples and/or the previously reconstructed reference sample, or the like, may be used for driving the prediction value of the reference sample. When the prediction value of the reference sample is derived, the decoder adds the parsed residual signal and the prediction value of the derived reference sample to generate the reconstructed reference sample. The detailed exemplary embodiment of the method for deriving the reference sample prediction value is described above in FIG. 10 and therefore, the detailed description thereof will be omitted.

When the reconstructed reference sample is obtained, the decoder may derive the second prediction value using the reconstructed reference sample (S1430). In this case, the decoder may derive the second prediction value by the same method as in the encoder. The detailed exemplary embodiment of the method for deriving the second prediction value using the reconstructed reference sample is described above in FIG. 11 and therefore, the detailed description thereof will be omitted.

According to the intra prediction method described in FIGS. 13 and 14, the prediction error may be reduced and the accuracy of the intra prediction can be improved, through the weighting sum of the first prediction value and the second prediction value. Therefore, the decoding efficiency can be improved.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

The invention claimed is:

1. An image decoding method performed by an image decoding apparatus, comprising:
deriving a first prediction value for a current block by performing prediction using, as a first reference sample, at least one of neighboring samples adjacent to the current block;
deriving a second prediction value for the current block by using, as a second reference sample, at least one of a reference sample positioned in the current block or a left upper corner sample adjacent to a left upper corner of the current block;
deriving a final prediction value for the current block by using values obtained by applying a first weight to the first prediction value and applying a second weight to the second prediction value; and
reconstructing a current block based on the derived final prediction value for the current block,
wherein the first weight and the second weight are determined based on which intra prediction mode is applied to the current block.

2. The method of claim 1, wherein the deriving of the second prediction value further comprises:
determining a position of the second reference sample;
reconstructing the second reference sample of the determined position; and
deriving the second prediction value using the reconstructed second reference sample.

3. The method of claim 2, wherein the determining the position of the second reference sample determines a predetermined fixed position as the position of the second reference sample.

4. The method of claim 2, wherein the determining the position of the second reference sample determines the position of the second reference sample using neighboring block information included in one or more reconstructed neighboring blocks,
the one or more reconstructed neighboring blocks being blocks adjacent to the current block and the neighboring block information being at least one of partition information, prediction direction information, and quantization parameter information of the reconstructed neighboring blocks.

5. An image encoding method performed by an image encoding apparatus, comprising:
deriving a first prediction value for a current block by performing prediction using, as a first reference sample, at least one of neighboring samples adjacent to the current block;
deriving a second prediction value for the current block by using, as a second reference sample, at least one of a reference sample positioned in the current block or a left upper corner sample adjacent to a left upper corner of the current block;
deriving a final prediction value for the current block by using values obtained by applying a first weight to the first prediction value and applying a second weight to the second prediction value; and
reconstructing a current block based on the derived final prediction value for the current block,
wherein the first weight and the second weight are determined based on which intra prediction mode is applied to the current block.

6. A non-transitory computer-readable medium storing a bitstream which is received and decoded by an image decoding apparatus and used to reconstruct an image, comprising:
deriving a first prediction value for a current block by performing prediction using, as a first reference sample, at least one of neighboring samples adjacent to the current block;
deriving a second prediction value for the current block by using, as a second reference sample, at least one of a reference sample positioned in the current block or a left upper corner sample adjacent to a left upper corner of the current block;
deriving a final prediction value for the current block by using values obtained by applying a first weight to the first prediction value and applying a second weight to the second prediction value; and
reconstructing a current block based on the derived final prediction value for the current block,
wherein the first weight and the second weight are determined based on which intra prediction mode is applied to the current block.

* * * * *